United States Patent Office 3,362,966
Patented Jan. 9, 1968

3,362,966
SUBSTITUTED 1,5-DIHYDROXY-4-ANILINO-8-NITRO-ANTHRAQUINONE DYES FOR POLYPROPYLENE
Joseph W. Dehn, Jr., Great Neck, and Harold J. Kuhefuss, Brooklyn, N.Y., assignors to Interchemical Corporation, New York, N.Y., a corporation of Ohio
No Drawing. Filed Sept. 5, 1963, Ser. No. 306,695
5 Claims. (Cl. 260—380)

This invention relates to 1,5 - dihydroxy - 4 - nitro-8-(alkylanilino)-anthraquinones, which are dyes for polypropylene.

The compounds of this invention were evaluated for comparison with about 70 related anthraquinone compounds to determine their value as dyes for polypropylene fibers. It was noted that 1,5 - dihydroxy - 4 - nitro-8-anilinoanthraquinone had considerably more affinity for polypropylene than did the isomeric 1,8 - dihydroxy-4-nitro - 5 - anilinoanthraquinone. It was also found that 1,5 - dihydroxy - 4 - nitro - 8 - (p-dodecylanilino)-anthraquinone had much more affinity for polypropylene than either of those two compounds and furthermore showed improved fastness properties. Also effective, but not quite as good as the dodecyl variety were 4-(p-n-butylanilino) - 8 - nitro - 1,5 - dihydroxyanthraquinone, 4-(2',4',6'-trimethylanilino)-8-nitro - 1,5 - dihydroxyanthraquinone, and 4 - (2',4',6' - triethylanilino) - 8 - nitro-1,5-dihydroxyanthraquinone. Of these the latter is somewhat better than the other two and is also better than 1,5-dihydroxy-4-nitro-8-anilinoanthraquinone.

Example 1.—4-(p-n-butylanilino)-8-nitro-1,5-dihydroxyanthraquinone

A mixture of 16.5 g. (50 millimoles) of 4,8-dinitroanthrarufin, 150 ml. of methyl Cellosolve and 22.4 g. (150 millimoles) of p-n-butylaniline was refluxed for 7 hours at 124°–120.5° C. 50 ml. more of the solvent were added and then the hot batch was filtered by suction and washed with 75 ml. of 95% ethanol. The dried blue-red filter cake was stirred into 1:10 hydrochloric acid, filtered, washed neutral and then was stirred into 2% sodium carbonate solution. The recovered product had a melting point of 245°–249° C. On recrystallization from toluene the material melted at 246°–249° C.

Example 2.—4-(p-dodecylanilino)-8-nitro-1,5-dihydroxyanthraquinone

A mixture of 9.9 g. (30 millimoles) of 4,8-dinitroanthrarufin, 100 ml. of methyl Cellosolve and 31.4 g. (120 millimoles) of p-dodecyl-aniline was refluxed for 7 hours at 126 to 122° C. 30 ml. of solvent were added and the material was suction filtered hot. The filtrate was drowned in 660 ml. of 1.2 molar hydrochloric acid and the resulting oil was filtered, the oily cake dissolved in acetone, and the acetone evaporated off. A benzene solution of the material was then extracted several times with 2 molar hydrochloric acid, water, 2% sodium carbonate solution and 2% sodium chloride solution until the water layer was neutral to litmus. The organic layer was filtered, evaporated and dried at 58° C. The blue oil was dissolved in refluxing hexane, chilled to 0° C., filtered, and washed with methanol. The solid thus recovered melted at 103–109° C. After being recrystallized from toluene it had a melting point of 113.5°–119.5° C. Chromatography showed that no green or violet component was present nor any 4,8-dinitroanthrarufin.

Example 3.—4-(2',4',6'-trimethylanilino)-8-nitro-1,5-dihydroxyanthraquinone

A mixture of 9.9 g. (30 millimoles) of 4,8-dinitroanthrarufin, 100 ml. of methyl Cellosolve and 16.2 g. (120 millimoles) of 2,4,6-trimethylaniline was refluxed 47 hours at 125 to 123.5° C. More solvent was added and the batch was filtered hot and washed with 35 ml. of solvent. The warm filtrate was drowned in 660 ml. of 1.2 molar hydrochloric acid and the resulting precipitate was filtered, washed with dilute acid and water until the filtrate was neutral. The wet cake was stirred into 400 ml. of 2% sodium carbonate solution, filtered and washed until neutral. The dried cake was stirred once more in 2% sodium carbonate, filtered and washed as before. The dark blue product melted at 263–277° C. Recrystallized from toluene, its melting point was 296–300° C. Chromatography showed the absence of green and violet components.

Example 4.—4-(2',4',6'-triethylanilino)-8-nitro-1,5-dihydroxyanthraquinone

A mixture of 16.5 g. (50 millimoles) of 4,8-dinitroanthrarufin, 150 ml. of 2-ethoxyethanol, and 34.2 g. (193 millimoles) of 2,4,6 - triethylaniline was refluxed 6 days at 127–130° C. Solvent was added and the batch was filtered hot and washed with 75 ml. of 95% ethanol. The warm filtrate was drowned in 1100 ml. of 1.2 molar hydrochloric acid, filtered, washed and the filter cake stirred into 700 ml. of 2% sodium carbonate solution, filtered, and the wet filter cake was again stirred in sodium carbonate solution overnight. The recovered solid was recrystallized from toluene. The M.P. was 244°–249° C. Chromatography showed that the blue product contained some violet impurities and a little 4,8-dinitroanthrarufin.

Dyeing tests were made by scouring 5 g. of polypropylene cloth for 30 minutes at 70° C. in a solution containing 5 cc. of a 1.0% "Sulframin AB–40" solution, 1.25 cc. of 1.0% sodium carbonate, and 200 cc. of water. The dye (both 0.5% and 2.0% dyeings were made) was dispersed with 5 cc. of 1.0% "Sulframin AB–40" solution and 200 cc. of water. The fabric was entered and dyed 2 hours at boiling temperature, the liquid level being maintained. The dyed cloth was again scoured 30 minutes at 70° C. using a bath containing 5 cc. of 1.0% "Sulframin AB–40" solution, 10 cc. of 1.0% sodium carbonate solution, and 200 cc. of water. The fabric was finally rinsed with water.

"Sulframin AB–40" is sodium alkyl benzene sulfonate.

What is claimed is:
1. A dyestuff for polypropylene fibers selected from the group consisting of
   (a) 4-(p-n-butylanilino) - 8 - nitro - 1,5 - dihydroxyanthraquinone,
   (b) 4-(p-dodecylanilino) - 8 - nitro - 1,5 - dihydroxyanthraquinone,
   (c) 4-(2',4',6'-trimethylanilino)-8-nitro-1,5-dihydroxyanthraquinone,
   (d) 4 - (2',4',6'-triethylanilino) - 8 - nitro - 1,5 - dihydroxyanthraquinone.
2. A dyestuff for polypropylene fibers consisting of 4-(p-n-butylanilino) - 8 - nitro - 1,5 - dihydroxyanthraquinone.
3. A dyestuff for polypropylene fibers consisting of 4-(p-dodecylanilino ) - 8 - nitro - 1,5 - dihydroxyanthraquinone.
4. A dyestuff for polypropylene fibers consisting of 4-(2',4',6'-trimethylanilino) - 8 - nitro - 1,5 - dihydroxyanthraquinone.

5. A dyestuff for polypropylene fibers consisting of 4-(2',4',6'-triethylanilino) - 8 - nitro - 1,5 - dihydroxyanthraquinone.

References Cited

UNITED STATES PATENTS

| | | | |
|---|---|---|---|
| 2,226,909 | 12/1940 | Peter | 260—380 |
| 2,819,275 | 1/1958 | Grossmann et al. | 260—380 |
| 2,727,945 | 12/1955 | McSheehy | 260—378 |

OTHER REFERENCES

Salvin et al., American Dyestuff Reporter, July 13, 1959, pp. 35–43.

LORRAINE A. WEINBERGER, *Primary Examiner.*

LEON ZITVER, *Examiner.*

R. K. JACKSON, H. C. WEGNER, *Assistant Examiners.*